March 14, 1967 V. J. HIGGINS 3,309,626

MICROWAVE LIMITER

Filed Dec. 3, 1964

INVENTOR,
VINCENT J. HIGGINS.

BY: Harry M. Saragovitz,
Edward J. Kelly,
Herbert Berl &
Julian C. Keppler

ATTORNEYS.

United States Patent Office 3,309,626
Patented Mar. 14, 1967

3,309,626

MICROWAVE LIMITER

Vincent J. Higgins, Keansburg, N.J., assignor to the United States of America as represented by the Secretary of the Army Filed Dec. 3, 1964, Ser. No. 415,836
5 Claims. (Cl. 333—17)

The invention described herein may be manufactured and used by or for the Government for governmental purposes without the payment of any royalty thereon.

The present invention relates to microwave limiters and more particularly to a self-biasing, semiconductor diode means for limiting the level of power in a microwave transmission device.

Microwave switches and limiters using semiconductor diodes are usually characterized by bulky and expensive hybrid waveguides, and/or external biasing and switching networks.

Accordingly, it is an object of the present invention to provide a compact, inexpensive, semiconductor, limiter for use at microwave frequencies.

In accordance with this object the invention comprises a microwave transmission means such as a rectangular waveguide with a plurality of series stubs mounted thereon. In each stub is mounted a semiconductor diode, the impedance of which is nonlinear with respect to the power in the waveguide. At low power levels the diodes will absorb only a small amount of power. At high power levels the diodes will present a high impedance and the power will be attenuated. The limiting is enhanced by providing a plurality of diodes interconnected to provide self-biasing.

Figure 1:
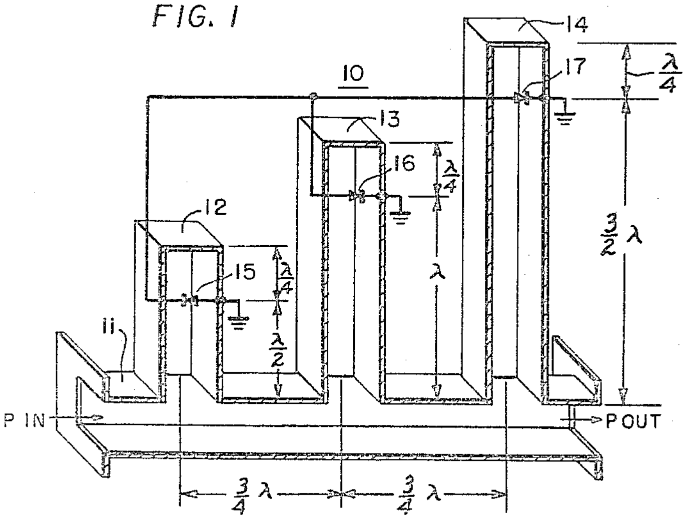
Figure 4:
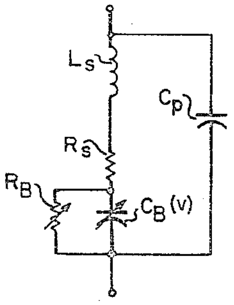
Figure 2:
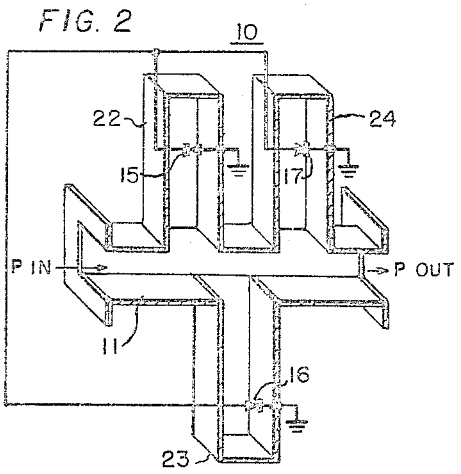
Figure 5:
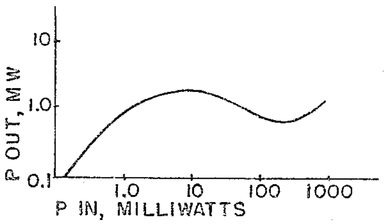
Figure 3:
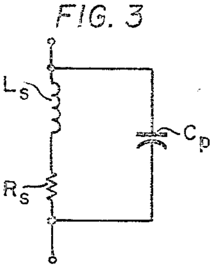

The above and other features of the invention will be described in detail in the following specification taken in connection with the accompanying drawings, in which FIG. 1 is a perspective view of section of one form of the invention, FIG. 2 is a perspective view in section of another form of the invention, FIGS. 3 and 4 are schematics of the equivalent circuit of the semiconductor diodes of this invention, and FIG. 5 is a graph illustrating the performance characteristics of the device of FIGS. 1 and 2.

Referring to the drawing, wherein like reference characters represent like or similar parts throughout the several views, there is shown in FIG. 1, a limiter 10 comprising a rectangular waveguide 11 having a plurality of series stubs 12, 13, and 14 extending therefrom. Mounted across stubs 12, 13, and 14 are diodes 15, 16, and 17 respectively. The spacings between diodes 15, 16, and 17 and the junction of waveguide 11 and stubs 12, 13, and 14 respectively are a multiple of a half wavelength. The stubs 12, 13, and 14 are terminated in shorted walls which are spaced an odd multiple of a quarter wavelength from diodes 15, 16, and 17 respectively. The stubs 12, 13, and 14 are mounted along waveguide 11 and spaced, from center to center, by an odd multiple of a quarter wavelength. The diodes 15, 16, and 17 are connected in parallel with each other and with the electrodes of the diode closets to the input end, i.e., diode 15, reversed with respect to the electrodes of the remaining diodes, i.e., diodes 16 and 17. The anode of diode 15 is grounded and connected to the wall of stub 12 and the cathode is connected directly to the anodes of diodes 16 and 17. The cathodes of diodes 16 and 17 are grounded and connected to the walls of stubs 13 and 14 respectively. The stubs 12, 13, and 14, which may be any height that is a multiple of a half plus quarter wavelength, are preferably stepped in height to provide easy access to the diode terminals. The minimum heights for the stubs of the configuration as shown in FIG. 1 would be three quarters of a wavelength for stub 12 with diode 15 spaced one half wavelength from the junction, five quarters of a wavelength for stub 14 with diode 16 spaced one wavelength from the junction, and seven quarters of a wavelength for stub 15 with diode 17 spaced three halves of a wavelength from the junction. Also, from center to center, each stub would be spaced three quarters of a wavelength from the adjacent stub. Because of the spacing and stepping of the stubs, connectors may be easily attached to the walls of the stubs without interference from the adjacent stubs.

FIG. 2 shows a configuration which permits a minimum size for the overall device. The height of stubs 22, 23, and 24 are equal to each other and minimal, i.e., three quarters of a wavelength. The stubs 22, 23, and 24 are staggered on opposite sides of waveguide 11 with minimal spacing of one quarter wavelength from center to center. The width of each stub is equal to the height of waveguide 11 which, in the example shown in FIGS. 1 and 2 is approximately one quarter wavelength. The diodes 15, 16, and 17 of FIG. 2 are connected in the same manner as in FIG. 1, i.e., diode 15 is reversed with respect to the other diodes 16 and 17.

The operation of the device may be best understood with reference to the diode equivalent circuits shown in FIGS. 3 and 4 which represent the diodes in the forward and zero bias condition respectively. From the equivalent circuits it may be seen that the nonlinear characteristic of the diode is mostly a result of the transition region or barrier layer capacitance represented by $C_B(v)$. The capacitance $C_B(v)$ is predominant over any diffusion capacitance arising from minority carrier storage. The barrier layer capacitance $C_B(v)$ as a function of voltage V is defined approximately as $$C_B(v) \approx \frac{C_o}{\left(1-\frac{v}{\theta}\right)^{1/n}}$$

where $C_o$ is the zero barrier capacitance and $\phi$ is the contact or built-in voltage of the barrier and is a function of semiconductor doping with impurity atoms. For abrupt junctions, e.g., alloy junctions, point contact diodes, $n$ is two; for graded junctions, e.g., diffused mesa types as in most varactors, $n$ is three. With the diode at zero bias or biased in the reversed direction the resistance $R_B$ is large and may be ignored when expressing the impedance since $R_B$ is shunted by the barrier capacitance reactance. The diode equivalent circuit may be viewed as a series R-L-C circuit shunted by the package capacitance $C_p$ which is the capacitance of the entire package structure which makes up the diode. The series R-L-C circuit consists of $L_S$ which is the lead inductance, $R_S$ which is called the spreading resistance, and $C_B(v)$ the barrier capacitance. At zero bias the impedance is then $$Z_o = \frac{\dfrac{R_S + j\left(wL_S - \dfrac{1}{wC_B}\right)}{jwC_p}}{R_S + j\left[wL_S - \left(\dfrac{1}{wC_p} + \dfrac{1}{wC_B}\right)\right]}$$

Assuming that the lead inductance $L_S$ resonates with the barrier capacitance $C_B$, which is a good approximation for standard diodes at microwave frequencies, that is, $$\frac{1}{wC_B} = wL_S$$

the above expression for diode impedance $Z_o$ at zero bias reduces to:

$$Z_o \approx R_S(1 - jwC_pR_S)$$

It is noted that to obtain the above expression $R_S^2$ is assumed to be much smaller than $Xc_p^2$ which is the usual case at microwave frequencies. It can, therefore, be seen from the above approximation that the diode impedance at zero bias, i.e., $Z_0$, is small and not much larger than the spreading resistance $R_S$ which is usually relatively small.

At low power levels, the diodes 15, 16, and 17 may be considered to be substantially at zero bias since only small amounts of energy will be coupled to them and the barrier will still be effective. Since the diodes are spaced from the junction by multiples of a half wavelength, the impedance presented by the diodes will be the impedance at the junctions in series with the waveguide 11. Therefore, since the impedance of each diode is relatively small or negligible at zero bias, the impedance across the junction will be small or substantially a short circuit. It is, therefore, evident that at low power levels energy will propagate along waveguide 11 with little or no attenuation. Of course, the diodes will be responsible for some attenuation due to the insertion loss, but the "power out" at low power levels will be directly proportional to and slightly less than the "power in." A typical curve showing "power in" vs "power out" is illustrated in FIG. 5 and will be discussed further on.

As the "power in" is increased, however, a larger amount of microwave energy will be absorbed by diode 15 and a point will be reached where there will be sufficient current flow in diode 15 so that the forward bias voltage V will be equal to or greater than the barrier potential $\phi$. For this bias condition the barrier will be effectively shorted and the diode equivalent circuit will now be an R-L series circuit shunted by the package capacitance $C_p$ as shown in FIG. 3. $R_S$ is simply the spreading resistance and $L_S$ is the lead inductance. The diode impedance for forward bias is then:

$$Z_F=\frac{\frac{L_S}{C_p}-j\frac{R_S}{wC_p}}{R_S+j\left(wL_S-\frac{1}{wC_p}\right)}$$

Assuming that the parameters $L_S$ and $C_p$ are such that antiresonance occurs, that is $$wL_S=\frac{1}{wC_p}$$

then the impedance would be simply $$Z_F=\frac{L_S}{R_SC_p}-j\frac{1}{wC_p}$$

At microwave frequencies the ratio $L_S/C_p$ is quite large while $R_S$ is quite small. Therefore, the impedance of the diodes 15, 16, and 17 at forward bias is very large as can be seen from the first term of the above expression. As before, the impedance presented by the diodes will be the impedance of the junctions because of the half wavelength spacing. Since the impedance presented by the diode is large, the impedance at the junctions will be large and thereby cause a high attenuation of power. It can now be seen, that the power absorbed by diode 15 will cause a current flow through diode 15 which will split up and flow through diodes 16 and 17, thereby biasing diodes 16 and 17 into forward conduction. Therefore, whatever power is not absorbed by diode 15 will be attenuated further by the next junctions.

It should be noted that the turn off time of standard diodes is usually longer than the period of a half cycle at microwave frequencies. Therefore, the diodes 15, 16, and 17 when forced into conduction during the positive half cycles will continue to conduct during the negative half cycles. There will, therefore, be a rectified current flowing through the diodes 16 and 17 to bias them in the forward direction.

Of course, a device with only one series stub such as stub 12 in FIG. 1 or stub 22 in FIG. 2 will produce limiting action by simply connecting a short across diode 15. However, by adding additional stubs and diodes at odd multiples of a quarter wavelength and by connecting the diodes in parallel as shown, the limiting action is enhanced. There will be, however, a practical limit to the number of stubs which may be added without having an unreasonable amount of insertion loss.

FIG. 5 shows the curve for "power in" vs "power out" for a limiter having three stubs and operating at 9350 mc./sec. The curve is somewhat linear for values below one milliwatt of input power. As can be seen, the curve is not flat and has a dip above 100 milliwatts since $C_B$ at these values is substantially zero and antiresonance occurs causing maximum isolation.

Of course, the structure shown in FIGS. 1 and 2 may be modified to act as a switch by adding biasing networks to the diode circuits. Obviously, many other modifications and variations of the present invention are possible in the light of the above teachings. It is therefore to be understood, that within the scope of the appended claims, the invention may be practiced otherwise than as specifically described.

What is claimed is:

1. A microwave limiter comprising a waveguide having an input end and an output end, a plurality of series stubs connected to said waveguide intermediate said ends, each said stub terminating in a shorted wall, a plurality of semiconductor diodes each mounted in a separate one of said stubs and spaced an integral multiple of a half wavelength from the associated waveguide stub junction, said end walls being spaced from its associated diode an odd number of quarter wavelengths, and means connecting said diodes in parallel with each other and with the diode located closest to said input end reversed in polarity with respect to the other of said diodes.

2. The device according to claim 1 and wherein said stubs are all mounted on one side of said waveguide and the centers of adjacent junctions are spaced from each other an odd number of quarter wavelengths.

3. The device according to claim 1 and wherein said stubs are mounted alternately on opposite sides of said waveguide.

4. The device according to claim 3 and wherein all of said stubs are three quarters of a wavelength long and said diodes are spaced one half wavelength from said junctions.

5. The device according to claim 4 and wherein the centers of successive junctions are spaced a quarter wavelength from each other.

References Cited by the Examiner

UNITED STATES PATENTS 3,038,086 6/1962 Sterzer ---------- 328—92
3,069,629 12/1962 Wolff ---------- 328—92

ELI LIEBERMAN, *Primary Examiner.*

HERMAN KARL SAALBACH, *Examiner.*

M. NUSSBAUM, *Assistant Examiner.*